US010787176B2

(12) United States Patent
Durney et al.

(10) Patent No.: US 10,787,176 B2
(45) Date of Patent: Sep. 29, 2020

(54) PLUG-COMPATIBLE INTERFACE BETWEEN CARS AND THEIR HUMAN AND/OR COMPUTER DRIVERS

(71) Applicant: A Truly Electric Car Company, Millbrae, CA (US)

(72) Inventors: Edward Gordon Durney, Millbrae, CA (US); Benjamin L. Ipson, Broken Arrow, OK (US)

( * ) Notice: Subject to any disclaimer, the term of this patent is extended or adjusted under 35 U.S.C. 154(b) by 151 days.

(21) Appl. No.: 15/706,658

(22) Filed: Sep. 15, 2017

(65) Prior Publication Data

US 2018/0001901 A1 Jan. 4, 2018

Related U.S. Application Data

(63) Continuation-in-part of application No. 15/049,004, filed on Feb. 19, 2016.

(51) Int. Cl.
*B60W 50/08* (2020.01)
*B60R 16/023* (2006.01)
(Continued)

(52) U.S. Cl.
CPC ........... *B60W 50/08* (2013.01); *B60R 16/023* (2013.01); *B60W 50/0098* (2013.01);
(Continued)

(58) Field of Classification Search
CPC .... G01S 17/023; G01S 7/4972; G01S 17/936; G01S 17/87; G01S 13/84; G01S 17/86; G01S 17/931; G05D 1/0257; G05D 1/024; G05D 1/0248; G05D 1/0214; G05D 1/0274; G05D 1/0246; G05D 1/0027; G05D 1/0088; G05D 1/0022; G05D 1/0061; G05D 1/0278; G05D 1/0251; G05D 1/021; G08G 1/16; G08G 1/005; G08G 1/165;
(Continued)

(56) References Cited

U.S. PATENT DOCUMENTS 9,632,502 B1 * 4/2017 Levinson .............. G01S 7/4972
10,167,015 B2 1/2019 Rust et al.
(Continued)

OTHER PUBLICATIONS

Elektrobit Automotive GMBH, "Open Robinos Specification: Architecture, Mechanisms, Interfaces, and Testing, 1.1.0, Released", 2017 (month and day unknown), 65 pages.
(Continued)

*Primary Examiner* — Behrang Badii
(74) *Attorney, Agent, or Firm* — Patent Strategies; Edward Durney

(57) ABSTRACT

A plug-compatible interface between a car and its human and/or computer driver makes both car and driver a "black box", or abstraction, to the other. The two black boxes can then be developed and built independently before being integrated together only at the final stage. Designers on both the car and driver sides of the interface need design only to the interface and need not worry about how things are done on the other side of it. When cars and computer drivers are built to interact over a plug-compatible interface, any computer driver works with any car. If a computer driver becomes outdated, it can be updated or replaced much more quickly and cheaply than replacing the entire car.

2 Claims, 9 Drawing Sheets

HUMAN VERSUS COMPUTER DRIVER USING SAME INTERFACE

(51) Int. Cl.

| | |
|---|---|
| ***G05D 1/02*** | (2020.01) |
| ***G05D 1/00*** | (2006.01) |
| ***B60W 50/00*** | (2006.01) |
| ***G06F 9/4401*** | (2018.01) |
| ***B60W 50/10*** | (2012.01) |
| *G01S 13/86* | (2006.01) |

(52) U.S. Cl.
CPC ........... *B60W 50/10* (2013.01); *G05D 1/0088* (2013.01); *G05D 1/021* (2013.01); *G06F 9/4413* (2013.01); *B60R 16/0231* (2013.01); *B60W 2050/0006* (2013.01); *B60W 2050/0018* (2013.01); *B60W 2540/21* (2020.02); *B60W 2540/215* (2020.02); *G01S 13/867* (2013.01); *G05D 1/00* (2013.01); *G05D 1/02* (2013.01); *G05D 1/024* (2013.01); *G05D 1/0246* (2013.01); *G05D 1/0248* (2013.01)

(58) Field of Classification Search
CPC ........ G08G 1/166; G08G 1/202; G08G 1/163; G08G 1/017; B60W 30/00; B60W 50/08; B60W 50/045; B60W 50/14; B60W 10/18; B60W 10/20; B60W 30/16; B60W 30/165; B60W 10/04; B60W 50/0098; B60W 50/10; B60W 2540/215; B60W 2540/21; B60W 2050/0006; B60W 2050/0018; B60Q 1/50; H04L 67/12; H04L 67/10; H04L 41/0816; G06N 7/005; G06N 20/00; G06Q 10/00; G06K 9/3241; G06K 9/00805; G06K 9/209; G07C 5/008; B60R 1/00; B60R 16/023; B60R 16/0231; G06F 9/451; G06F 9/4413
See application file for complete search history.

(56) References Cited

U.S. PATENT DOCUMENTS

| | | | | |
|---|---|---|---|---|
| 2005/0023049 | A1* | 2/2005 | Ferree | B60K 17/10 180/6.3 |
| 2005/0085984 | A1* | 4/2005 | Uhler | B60K 31/0008 701/70 |
| 2007/0198144 | A1* | 8/2007 | Norris | B60T 7/22 701/23 |
| 2009/0240408 | A1* | 9/2009 | Wolfgang | B60W 10/06 701/55 |
| 2009/0241708 | A1* | 10/2009 | Schaedler | B60K 17/10 74/388 PS |
| 2009/0242284 | A1* | 10/2009 | Whetstone, Jr. | B62B 5/0026 180/19.2 |
| 2010/0106356 | A1* | 4/2010 | Trepagnier | G05D 1/0248 701/25 |
| 2012/0239224 | A1* | 9/2012 | McCabe | B66F 9/063 701/2 |
| 2013/0116908 | A1* | 5/2013 | Oh | G01S 19/07 701/96 |
| 2013/0190963 | A1* | 7/2013 | Kuss | B66F 9/063 701/23 |
| 2013/0231829 | A1* | 9/2013 | Gerdt | G05D 1/0088 701/41 |
| 2015/0260143 | A1* | 9/2015 | Yorke | F02N 11/0822 701/112 |
| 2015/0370252 | A1* | 12/2015 | Hanson | B63B 1/042 701/2 |
| 2016/0167653 | A1 | 6/2016 | Malone et al. | |
| 2016/0231746 | A1* | 8/2016 | Hazelton | G01S 13/867 |
| 2017/0106865 | A1* | 4/2017 | Lavoie | B62D 15/027 |
| 2017/0174227 | A1* | 6/2017 | Tatourian | G06K 9/3241 |

OTHER PUBLICATIONS

Kyle Vogt, Ceo and founder of Cruise Automation, "How we built the first real self-driving car (really)", Sep. 11, 2017, https://medium.com/kylevogt/how-we-built-the-first-real-self-driving-car-really-bd17b0dbda55, 8 pages, downloaded on Sep. 11, 2017.

Autonomoustuff, "AStuff Speed and Steering Control Software", date unknown, 1 page, downloaded from https://autonomoustuff.com/product/astuff-speed-steering-control-soflware/ by selecting the Media tab on Dec. 26, 2017.

John R. Quain, "Self-Driving Cars Might Need Standards, but Whose?", The New York Times, Feb. 23, 2017, 8 pages, downloaded from https://www.nytimes.com/2017/02/23/automobiles/wheels/self-driving-cars-standards.html on Dec. 26, 2017.

* cited by examiner

EXAMPLE OF AN INTERFACE INCOMPATIBILITY

PRIOR ART VERSUS INTERFACE

HUMAN VERSUS COMPUTER DRIVER USING SAME INTERFACE

- CAR AND DRIVER ARE BOTH "BLACK BOXES" LOOSELY COUPLED TOGETHER THROUGH AN INTERFACE
- THE DRIVER MAY BE A HUMAN, OR COMPUTER, OR BOTH

ANY CAR, ANY DRIVER, SAME INTERFACE

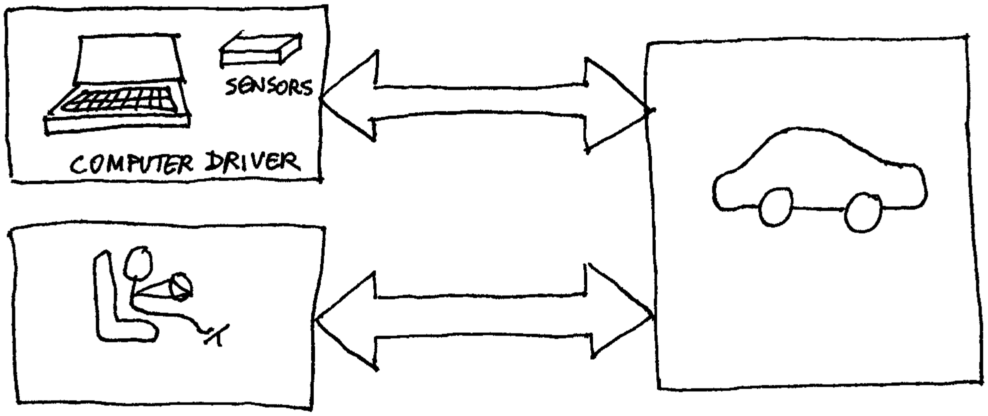
(a) COMPUTER AND HUMAN DRIVERS BOTH INTERFACE TO CAR. CAR DECIDES WHICH INPUT TO FOLLOW.
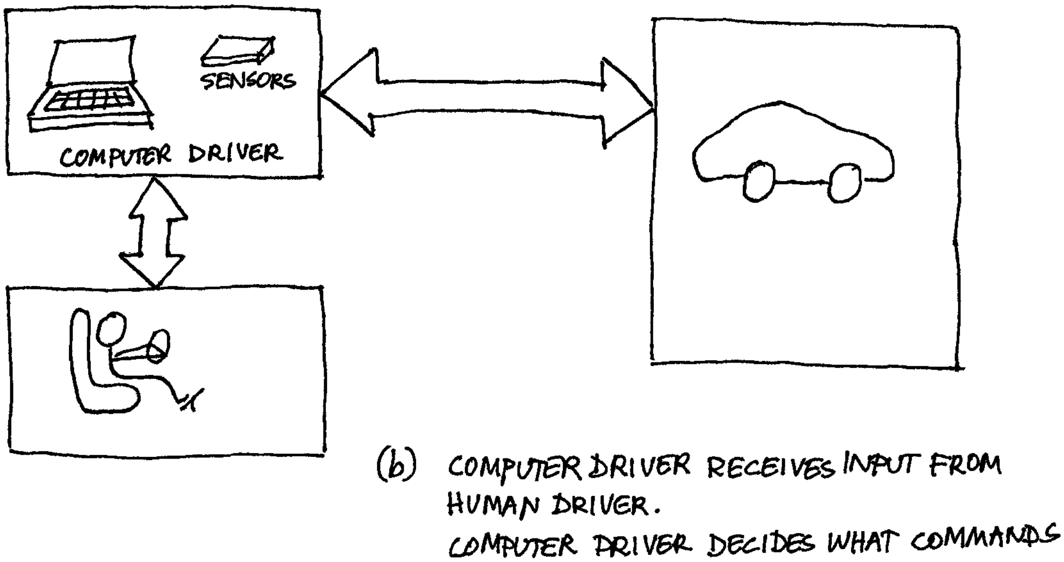
(b) COMPUTER DRIVER RECEIVES INPUT FROM HUMAN DRIVER. COMPUTER DRIVER DECIDES WHAT COMMANDS TO SEND TO CAR.
FIGURE 6
TWO WAYS TO COMBINE HUMAN AND COMPUTER DRIVERS TO MOVE AS DESIRED BY THE DRIVER THE CAR NEEDS, AT A MINIMUM, A VECTOR WITH MAGNITUDE BEING SPEED AND DIRECTION BEING DIRECTION

VECTOR IS MINIMUM INFORMATION NEEDED

PHYSICAL INTERFACE

DATA INTERFACE:

<Car>----<Driver>

Form of Communications:

- Communication between the Car and Driver uses TCP sockets on port 9113 with the Car acting as server and the Driver as client.
- Communication is event-based, meaning that messages are sent when something changes rather than at regular intervals.
- Messages are sequences of 8-bit characters.
- Each message has a command followed by a value (optional). The delimiter for the command string is [0x03] and the delimiter for the value string (and for the entire message) is [0x04].

Form of Commands:

- Each command has three forms:
  1) a normal form that specifies a value for a state variable
  2) a STATUS form used to report values back to the Driver as confirmation or in response to a query
  3) a _QUERY form used by the Driver to find out the current value of a state variable
- All letters in command names and values are upper case.
- Underscores separate words.
- Numbers are sequences of ASCII/Unicode characters. There are no leading zeros, so a one will be 1, a ten will be 10, and one hundred will be 100.
- The only numbers are integers.

Implemented Commands:

- Normal form of commands (each command name corresponds to the name of a state variable):

FORWARD <number in range 0 to 255 with 0 for no throttle, 255 for full throttle>

REVERSE <number in range 0 to 255 with 0 for no throttle, 255 for full throttle>

STEERING <number in range -127 to 128 with -127 for full left and 128 for full right>

BRAKES <number in range 0 to 255 with 0 for no braking and 255 for full braking>

HEADLIGHTS OFF (no light) LOW_BEAM (normal low-beam headlights) HIGH_BEAM (high-beam headlights)

TURN_SIGNAL OFF LEFT RIGHT

REVERSE_LIGHTS OFF ON

BRAKE_LIGHTS OFF ON

WIPERS FRONT OFF ON INT1 INT2 ... INT6 (for intermittent or intervals, with INT1 being the longest time with the wipers off and INT6 with the shortest time with wipers off) REGULAR FAST WIPERS_BACK same values as WIPERS_FRONT

WASHER_FRONT OFF ON

WASHER_BACK OFF ON

HORN OFF ON

HAZARD_LIGHTS OFF ON

FIGURE 9A

EXAMPLE 1 AND 2 INTERFACE SPECIFICATIONS

Notes on Commands:

- The Driver must make sure that the reverse lights and brake lights are turned on when the driver puts the car in reverse or brakes.
- The Driver must blink the turn signals and hazard lights on and off by sending on and off signals to the Car.

Sample Sequences:

- Driver brakes
  *Driver to Car:* FORWARD[0x03]25[0x04]
  *Car to Driver:* FORWARD STATUS[0x03]25[0x04]
  *Driver to Car:* BRAKES[0x03]100[0x04]
  *Car to Driver:* BRAKES STATUS[0x03]100[0x04]
  *Driver to Car:* BRAKE LIGHTS[0x03]ON[0x04]
  *Car to Driver:* BRAKE_LIGHTS_STATUS[0x03]ON[0x04]

- Driver releases brakes
  *Driver to Car:* BRAKES[0x03]0[0x04]
  *Car to Driver:* BRAKES STATUS[0x03]0[0x04]
  *Driver to Car:* BRAKE LIGHTS[0x03]OFF[0x04]
  *Car to Driver:* BRAKE_LIGHTS_STATUS[0x03]OFF[0x04]

- Driver is updating driver display:
  *Driver to Car:* HEADLIGHTS QUERY[0x03][0x04]
  *Car to Driver:* HEADLIGHTS STATUS[0x03]OFF[0x04]
  *Driver to Car:* WIPERS FRONT QUERY[0x03][0x04]
  *Car to Driver:* WIPERS FRONT STATUS[0x03]INT3[0x04]
  *Driver to Car:* WIPERS BACK QUERY[0x03][0x04]
  *Car to Driver:* WIPERS_BACK_STATUS[0x03]INT1[0x04]

FIGURE 9B

NOTES ON
EXAMPLE 1 AND 2 INTERFACE SPECIFICATIONS

DATA INTERFACE:

<Car>----<Driver>

Form of Communications:

- Communication between the Car and Driver uses USB serial communication through a serial port, such as COM5 (Windows) or /dev/ttyUSB0.
- Communication is event-based, meaning that messages are sent when something changes rather than at regular intervals.
- Messages are two bytes (16 bits) long.

Notes on Communications:

- Messages should be sent in two-byte chunks so that they do not clump together. Otherwise, some messages may become mixed up in order and ignored.

Form of Commands:

- Each command is two bytes in the form of:
  1) one-byte ASCII/Unicode character that tells what the command is
  2) one-byte integer that gives the data associated with the command Implemented Commands:

- Normal form of commands:

A (for speeding up) <number in range 0 to 255 with 0 for no speeding up and 255 for speeding up as quickly as possible>

B (for slowing down) <number in range 0 to 255 with 0 for no slowing down and 255 for slowing down as quickly as possible>

S (for turning right or left) <number in range -127 to 128 with -127 for full left and 128 for full right>

D (for forward or reverse direction) <0 (forward); 1 (reverse)>

P (for parking brake) <0 (off); 1 (on)>

R (for right turn signal) <0 (off); 1 (on)>

L (for left turn signal) <0 (off); 1 (on)>

H (for horn) <0 (off); 1 (on)>

Sample Command Sequences:

- Accelerate quite quickly

*Driver to Car:* H[0x8F]
- Slow down slowly

*Driver to Car:* B[0x0F]
- Turn sharp right

*Driver to Car:* S[0x80]
- Turn left turn signal on

*Car to Driver:* L[0x01]

FIGURE 10

EXAMPLE 1A AND 3 INTERFACE SPECIFICATIONS

THE INTERFACE BETWEEN A SEMI-TRAILER AND TRACTOR

PLUG-COMPATIBLE INTERFACE BETWEEN CARS AND THEIR HUMAN AND/OR COMPUTER DRIVERS

COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCE TO RELATED APPLICATIONS

This application is a continuation-in-part of pending U.S. application Ser. No. 15/049,004 entitled "Car operating system" filed Feb. 19, 2016, which is hereby incorporated by reference.

COMPUTER CODE LISTING

We gave the patent office as text files a computer code listing for an example of the two sides of an interface: a driver control unit and a car operating system. That code listing contains two files:

18,576-byte ASCII file "Car.txt" created on Sep. 15, 2017

23,598-byte ASCII file "Driver.txt" created on Sep. 15, 2017

The Car.txt file is written in Python and runs on Windows or Linux. The Driver.txt file is written in C++ and runs on Windows. The computer code listing is part of the disclosure of this invention, and a copy can be obtained from the patent office. Or contact either of us (the inventors) for a copy.

INTRODUCTION

Self-driving cars get lots of attention these days. Billions of dollars are being spent developing them. Many—maybe most—new cars have some level of computer-assisted driving. Thousands of fully autonomous cars roam the world's roads in testing.

But there are roadblocks to cars with more capable computer drivers. Self-driving technology is not moving onto our roads as quickly as hoped. Want to speed it up? These people have a problem you need to solve:

A startup that wants to bring its new self-driving technology to market.

A big carmaker that wants the best self-driving technology for its cars.

The owner of a five-year-old car who wants the new self-driving technology available on this year's cars.

A government or industry official who worries that the newest self-driving technology hitting the roads may not be safe enough.

Each has a problem that stems from the same fact: Today's self-driving technology needs to be tightly coupled and carefully integrated into a car specially designed and made with self-driving capability (as in United States Patent Application No. 2016/0167653 for an "Autonomous Ready Vehicle"). The self-driving technology must be built right into the car.

That tight integration makes a problem for a startup. It cannot sell its product directly to car owners—they cannot put the technology into their cars themselves. The startup must team up with a carmaker and spend lots of time and money before it can get its technology integrated into cars and on the road. Only then will sales revenue come in.

That tight integration makes a problem for a carmaker. It has to commit to one company's self-driving technology—either in-house or outside—early on in the development cycle. That is a big gamble that requires a lot of money be put at risk, and the carmaker cannot afford to fail.

That tight integration makes a problem for a car owner. If they want the latest self-driving technology, they have to buy a completely new car. They cannot get an upgrade to the self-driving technology on their old car except from the car's maker, and often not even then.

That tight integration makes a problem for a safety officer. How can they make sure the self-driving technology is safe when it is tightly integrated into, and thus hidden in, a car? They do not want problems with self-driving technology to be found only when people die.

We think those problems can be solved. How? Imagine that our invention is in wide use. Imagine that both self-driving programs and cars are "plug compatible", so that they can (usually) just be plugged in and are quickly ready to operate together.

Now the startup can make sales to car owners and to carmakers as soon as its technology is ready. The startup no longer needs to only sell its technology to a carmaker, wait for the carmaker to integrate the technology in its cars, and depend on the carmaker to do all the selling.

Now a carmaker need not take a "bet the company" risk at an early time, but can wait and hedge its bets as self-driving technology develops. That may not sound like a big difference, but it could save an executive's career.

Now a car owner can upgrade his or her car's self-driving technology by replacing it with the best from among several alternatives on the market. He or she need not buy a whole new car.

Now a safety officer in government or industry can rigorously test self-driving technology apart from just one particular car. That means that self-driving technology can be verified before it gets on the roads.

How would that all work? Here's how.

Glossary

Autonomous—see "Self-Driving".

Computer driver—see "Self-Driving".

Driver—the human or computer that controls the direction and speed of a car. There can be a driver and a co-driver, where drivers share control, just like a pilot and a co-pilot in an airplane. And a computer can be a driver or co-driver if given control, again just like an autopilot in an airplane.

Driverless—see "Self-Driving".

Integration—the merging of two or more separate things by tightly coupling them together.

Interface—a shared boundary by which two or more separate things connect and interact, usually by transferring something across the boundary, like data or power. The connection can be physical (like between a pickup truck and a boat trailer) or abstract (like between two computer programs). The connection is meant to be made and broken rather than to be permanent and fixed.

Interface specifications—the details of how two or more separate things connect across an interface, which may include:

Identification of what the interfacing things do

Specification of the information or other things to be exchanged

Timing and sequencing constraints

Capacity and performance requirements

Loosely coupled—when a connection between two or more things across an interface is meant to be made and broken rather than permanent, and there are only limited and well-defined interactions across the interface, the things are loosely coupled together.

Modular—a flexible design consisting of two or more modules, each of which performs some specified function and all of which are loosely coupled together across defined interfaces to form a whole. A module can be replaced by another module that performs the same function, and that will have little or no effect on the other modules.

Private interface—an interface used internally within a company that keeps the interface specifications confidential. A carmaker's DBC files might be an example of this. They are the proprietary, very secret CAN database files that describe the messages passed around on a car's integrated data network. Access to them within carmakers is very tightly controlled.

Partner interface—an interface for which a company and its partners share the interface specifications on a confidential basis to enable specific business relationships. Maybe a good example is a game console developer who shares the interface specifications with game developers porting their games to the console. Or maybe a carmaker shares all or part of its DBC files with some of the companies that supply parts or systems to the carmaker.

Plug-compatible—when a device performs the same function as another product (often produced by a different manufacturer) and can be "plugged" into the same interface without any changes, although its internal design may differ greatly. (We use "plug" in quotes because the interface connection does not literally need to be a plug and socket, just a physical or even abstract connection of some kind.)

Public interface—an external, open interface where the interface specifications are made public. These are probably the most common, especially since interface specifications can often be reverse-engineered anyway. Electrical plugs and sockets and the interface between semi-trailers and tractors are both public interfaces.

Self-driving—the capability to do some or all of the work of driving a car in place of a human driver. That requires some ability to sense the car's environment and to make decisions about how to maneuver the car in that environment. We also use "computer drivers", "autonomous" and "driverless" to mean much the same thing.

While some people use these terms only to mean fully self-driving (or computer driven or autonomous or driverless), we do not. We include as self-driving technology anything beyond human driving (SAE level 0). In other words, not only more highly automated (SAE level 3) cars, but anything from emergency braking or adaptive cruise control or lane departure warning (all at SAE level 1) up to fully automated driving (SAE level 5).

Tightly coupled—when two or more things are permanently coupled across an interface, and there are many interactions across the interface, the things are tightly coupled together. In that case, it's often not really an interface since the things are considered integrated into one thing.

What is a Car/Driver Interface?

Before talking about a car/driver interface, let's talk about interfaces in general. We give the definition of an interface in our glossary. As we noted, an interface is a connection meant to be made and broken rather than permanent. So interfaces usually involve plugs/sockets or bolts/holes rather than soldering or welding.

One example: an electrical plug that you can push into an electrical socket in your wall. Based on a standard specification, the plug and socket fit together to let electrical current flow. That connection is the interface.

The electrical plug/socket is an interface to get the electricity used by all the different things you can plug into the socket. Everything from your computer to your vacuum cleaner and hair dryer and smartphone and maybe even the charger for your electric car.

On one side is the electric company that provides your electricity. On the other side is the device that consumes it. Electricity flows through the interface. All you need to do to create the interface is to plug the device in.

While standards differ depending on country, electrical sockets have specified patterns of openings into which electrical plugs that match those patterns fit. The electricity provided also conforms to specifications. In North America, most wall sockets deliver 120 volts of alternating current at 60 Hz. Any device which has a plug to connect and can use that voltage and frequency can get electrical power across that interface.

For the interface to work, both the electricity provider and the consuming device have to know what is expected of the other, and meet that expectation. But as long as those expectations are met, anything goes.

That means that on the device side you can use your hair dryer at home in San Francisco and the same day travel to Salt Lake City and plug the hair dryer in at your hotel there. That means that on the power side a power company can send you electricity generated by a coal power plant or a nuclear power plant or a huge windmill or a solar panel on a roof and you need never know where your power comes from.

In design terms, specifying an interface tells what each side will do, but not how. The implementation detail of the "how" is hidden behind the abstraction of the "what". That allows a lot of flexibility in how the "how" is implemented, and how it can be changed over time. Interfaces are key to a modular architecture.

But that is electrical plugs and sockets. What about cars and drivers? With cars, the driver and the car must connect and communicate. In today's cars, that means the driver turns a steering wheel or pushes a brake pedal or accelerator pedal.

As long as the wheel and pedals are in their standard places and operate as usual, today's cars can easily accommodate a change in drivers. One driver gets out and another one sits down and drives away. But accommodating a computer driver—in other words, using a self-driving program—requires some work.

That is because computer drivers do not have arms and legs to operate wheels and pedals. So a car that allows for a computer driver typically has a mechanism for changing an electronic signal from a computer program into a mechanical signal that turns a steering wheel or pushes a gas or brake pedal.

The first cars with self-driving programs were driven by robots sitting in the front seat. At that time, there was extremely limited computer integration in cars. You could not directly tap into the car's electric interface to digitally control its driving functions like you sometimes can today—the wheel had to be physically steered and the pedals had to be physically pushed.

That was an example of an interface between a human and a machine, called a "human-machine interface" (HMI) or more simply a "user interface". To use that user interface, you connected your self-driving program to a robot that sat in the driver's seat and you gave it artificial arms and legs to work the controls—adding a mechanical problem to the software problem.

That was not unusual in the case of interfaces. For decades, most computer software had been conceived and written with one type of user in mind: a human. No matter what was happening under the hood of software, a human user was traditionally at the end of the process. That end user invariably consumed the software's data or functionality through a user interface—one that was designed to make the act of consumption as easy and even as enjoyable as possible.

But what if that same data or functionality is to be consumed by something else. Another piece of software. Or as in the case of self-driving cars, a machine. In that case, the interface concerns are very different. After all, software and computers and cars do not have eyes, arms, legs, emotions or intuition. They do not need an enjoyable, intuitive, easy-to-use user interface. However, just as with a user interface tailored to humans, machines need an interface that makes it easy to consume data or functionality.

For software, that meant an "application program interface", or API.

An application program interface is geared for consumption by software, which is why application program interfaces are often explained in the mainstream media as a technology that allows applications (software programs) to talk to one another. In this context, the terms "application", "software", "machines" and "computers" are virtually interchangeable. For example, application program interfaces are often described as being machine-readable interfaces (versus human-readable).

Our interface between self-driving programs and cars is not an application program interface, but it is like one in that we provide an abstract interface that works the same for self-driving programs, on one side, and cars, on the other. Both the computer driver and the car see the other side as a black box, with the interface loosely coupling them together.

Then computer drivers can be easily interchanged. We make computer drivers almost as interchangeable as human drivers. They may not sit down and put their seat belt on like a human driver, but the computer driver might just be plugged in and booted up. It will probably never be as easy as plugging an electrical device into a wall socket. And installing and hooking up sensors will always complicate things. But it should become pretty easy.

We should note that the computer driver does not need to completely replace the human driver. The interface between the computer driver and the car may be in addition to an interface between a human driver and the car. Or a human driver could interface with the computer driver, so that a combination of input from a human driver and a computer driver is sent to the car over the computer driver interface.

Since our interface does not require tight coupling and close integration, self-driving programs and cars can be plug-compatible on both sides. That is, they can be freely mixed and matched by companies who sell cars or even by car owners.

How would this plug-compatibility work? One example is the plug-compatible interface between semi-trailers and the tractors that move them. As shown in FIG. 11, a standard interface between the two that consists of two air hoses, an electrical cable, and a fifth-wheel/kingpin combination lets any tractor in North America couple with any semi-trailer. It takes just minutes to hook up and drive away.

Other examples of plug-compatible interfaces in cars include:

- the mechanical interface between the nozzle of a gasoline pump and a car gas tank, and
- the ball-and-socket mechanical interface and the electrical interface for lights and brakes between a car and a trailer.

Finally, an interface is defined by its specifications, which give the details of how things connect across an interface. Typically, these specifications describe in some detail what the interfacing things need to do, how they connect together, what they exchange, and how. An interface specification is usually contained in a document.

Interfaces can be private, partner or public. The specifications for a private interface are kept confidential, those for a partner interface are shared with partners, and those for a public interface are made public.

Why is a Car/Driver Interface Important?

We used the electrical plug/socket as an example of an interface. Imagine what life might be like without it—a mess. With no plug or socket specifications, we would need to hard wire appliances into the walls of buildings. This would involve a lot of exposing, stripping and soldering of wires together and we would need access to wires coming out of the wall. Moving a device from one place to another would be a big job.

The electrical plug/socket interface saves us from all of this. Plugs and sockets that conform to a standard give us big benefits:

- Devices are easily moved from one socket to another. You pull a plug out of one socket and stick it in another. No stripping wires. No soldering. No mess. Thanks to a plug-compatible interface, you can plug your devices in anywhere around the country very easily. Even if the standard interface changes—as it does when you travel from the United States to the United Kingdom—you can still get electricity easily through an adapter.
- The electrical socket interface is an abstraction (it hides the details) of the electricity provider. That makes a connecting device blind to details like the wiring in the walls, other devices it shares the wiring with, how the electricity is generated (windmills, a nuclear plant, a coal plant, or solar panels), and where the source of power is located. Since any compatible device can easily get electricity from an outside source and expect to get the same thing every time, device makers can focus on making their own devices better and not on figuring out how those devices are going to get their power (other than putting a power cord and plug on the device).
- The same thing works both ways. To the electricity provider, the devices that plug into the socket are abstractions. All devices look the same to it. It is blind to the details of the devices on the other side of the electrical socket. That gives the electricity provider a lot of flexibility. The source of power can be switched from a coal-burning plant to a wind farm. The wires on the street can be changed from above ground to underground. The systems that monitor the electric grid can be upgraded. The trucks that service the grid can be replaced. As long as the electric company delivers power to electricity-consuming devices based on the standard, the utility can make whatever business decisions it wants in order to serve power in an efficient, environmentally friendly and cost-effective way.

A car/driver interface is not that much different from electrical plugs and sockets and the benefits they provide to their consumers (such as computers and appliances). By decoupling cars and their computer drivers, we give both carmakers and self-driving car technology providers a lot more flexibility to innovate. Each is free to change its own technology without needing to worry about the effect those changes may have on the other.

With a plug-compatible car/driver interface, both the driver and the car appear as "black boxes" to the other. That is, the driver can just assume that the car will be able to carry out the commands it gives it. Similarly, the car need not know whether the driver is a human or a computer, since the commands will be the same in either case.

That compatibility lets the designers of both the computer driver and the car just design to an abstract interface rather than needing to carefully integrate their technology into the other technology. That use of abstraction simplifies what might otherwise be a complex design problem. Without a plug-compatible interface, it would be difficult to mix and match cars and computer drivers. Instead of computer drivers being easily interchangeable, each would need to have the car specifically customized for them.

Indeed, specific customization—the tight integration of a particular computer driver into a specific car—is the direction the carmaking industry is going. Cruise Automation, the driverless car startup acquired by General Motors, boasted on Sep. 11, 2017 that in their driverless car the software and hardware have been carefully and tightly integrated together.

Integrating a computer driver into a car works fine, but then what happens when technology evolves? Software technology evolves much more quickly than hardware technology. A car's self-driving technology may be obsolete even though the car it is used on is still good for years of driving. If they are tightly integrated, what can you do? Software is cheap to update or even replace. Not hardware.

That is a problem already. Some GPS units such as the one found in a 2003 Acura MDX are integrated into the car. As it stands, it cannot be updated with current or new maps or functionality because of the tight integration. Had an interface been in place the GPS system could easily be upgraded by replacing or updating the software and interfacing with the hardware.

Using black-box abstraction instead of doing tight integration can work well for both the makers of self-driving technology and carmakers. Each can concentrate only on their own technology, and need not know anything about what is on the other side of the interface. Integration of self-driving technology with a car is quick and easy.

Carmakers do not have to gamble on selecting just one self-driving technology provider, or settle for second (or third or fourth or so on) best because all the others have teamed with other carmakers. And carmakers do not have to expose their confidential DBC codes (that drive the power train and steering) to the self-driving technology companies. They can hide them behind abstractions.

Having a standard interface brings the benefits of abstraction into play. Abstractions reduce complexity because they throw away irrelevant detail and retain only the information that is necessary for a particular job. Without abstractions, any technology develops more slowly because innovators become overwhelmed by complexity.

The impact is not just on technology, but on business models too. Making certain functionality—be it the functions a car performs or the commands needed to drive the car—available through an interface dramatically changes the way that technology can be delivered to the market. Loose coupling and making things modular allow even small companies to participate in the biggest of markets.

The benefits to competition and innovation of plug compatibility can easily be seen in the computer industry. Apr. 7, 1964 was a red-letter date for the modern computer industry. On that date, IBM announced its System/360 with a modular architecture that separated a computer into functional modules linked by interfaces.

A few years later Memorex sold the first plug-compatible disk drive that worked with IBM mainframes. Soon other companies made other plug-compatible modules. This led to competition and consequent innovation on a scale never seen in the computer industry before. We might see the same thing with self-driving technology.

IBM did not need to be forced to allow for plug-compatible devices—IBM did it on its own. But that was unusual. In the case of self-driving technology, the government may need to step in and impose a standard. Why? Because innovators do not like competition. (After they win the competition, that is). They like monopoly instead.

Once innovators put their innovations on the market, they want to profit from their innovations rather than have the next innovator supplant them. That has been true from James Watt and his steam engine to Peter Thiel and his "zero to one" philosophy. That is the whole idea between the patent laws—rewarding inventors with a monopoly.

Governments need to be careful in this area. Patents have become such a powerful competitive tool that they can stifle innovation rather than promote it. Government regulation can also stifle innovation, since regulations tend to bless old technical solutions and discourage new ones.

But a plug-compatible interface can stimulate competition and thus innovation. A plug-compatible interface allows self-driving programs to be used, understood, built, tested, debugged and (perhaps most importantly) sold independently of the car, and vice versa. A company developing a self-driving program can test the program on one car and be fairly confident that it will then work on other cars as well.

Carmakers can do the same with their cars. They can focus on building the best car they can build and leave the self-driving technology to others, knowing that those who buy their car can also get the best self-driving technology to use in their car.

That stimulus to innovation alone will help. But government regulations requiring both self-driving technology makers and carmakers to make their products plug-compatible may help more. Interfaces evolve, even though most other government regulations tend not to. So government requirement that these products be plug compatible may well do good without doing harm.

The car industry may, like IBM did, adopt a plug-compatible interface voluntarily in order to keep government involvement light. But history teaches us that it may not be wise to count on that. Unless the government forces them to do differently, carmakers in particular will probably continue to build only integrated cars as they have done for more than a century.

Another big benefit of a plug-compatible interface will be more safety. Safety has, of course, always been critical for cars. It will be just as critical for self-driving cars. People are worried about the safety of self-driving technology, even people who are working on the technology. In fact, several engineers reportedly left Tesla Motors recently because they thought its Autopilot technology was being deployed before it was ready—"too much autonomy too soon".

Having a plug-compatible interface will help with safety in several ways.

First, limiting the interactions between the self-driving technology and the car will allow self-driving technologies to develop at their own pace. They will not need to move in lockstep with carmakers and their model changes.

That is important in carmaking. Self-driving technology is computer technology, evolving at the pace of smartphones where new models take over the market rapidly every year or two. Car technology, on the other hand, evolves glacially, where it often takes seven years or more for new technology to move from the proof-of-concept stage to being integrated into an actual car driving on the roads.

It may seem counterintuitive, but speed in getting new technology on the roads improves safety rather than harming it. New technology is (almost) always safer technology. Of course the new technology needs to be tested and the bugs worked out. But as noted below, a plug-compatible interface makes that easier to do. Once the technology is ready, the sooner it is in more cars, the safer we will all be.

Second, a plug-compatible interface makes simulation easy, as self-driving technology can simply be plugged into a simulator rather than needing to be integrated into one. That means risky situations can be simulated over and over again with no chance of death. Every problem that has caused a fatality could, for example, be used as a test scenario in a simulator when testing a self-driving program. Safety will improve.

Third, governments can regulate the technology and provide for testing before the technology hits the road. When self-driving technology is integrated into a car, it can be hard to regulate just the self-driving technology portion, and even harder to test just that portion. A plug-compatible interface helps solves those problems. Governments can then focus on improving self-driving technology safety with their regulation and testing.

Fourth, defective self-driving technology can be detected more easily and replaced more rapidly. A plug-compatible interface lets self-driving technology be "disintegrated" from the car it controls. So, for example, if a crash occurs, the self-driving technology can be more readily identified or eliminated as the cause. If it is the cause, the self-driving technology can quickly be upgraded or replaced in all cars in which it is used.

That means we can deploy the technology even if we have not yet solved all the hard problems. Those problems can be solved later. Of course, we need to make sure that those problems will not cause injury or death.

Fifth, self-driving technology can be rolled out more quickly to the market rather than waiting for only new cars to have it and populate the market. We need to speed up deployment. Right now only about 5% of the cars on the road in the United States are new cars purchased in the last year. So it takes 10 years for even half the cars on the road to be replaced. If existing cars can be upgraded with the newest technology, safety improves more rapidly.

To do that, though, we also need to have a standard that can evolve as technology evolves. History teaches us that setting standards by regulation can require industries to meet standards even after they become obsolete. Requiring that both car and driver sides of the interface be plug-compatible, while allowing that compatibility to evolve, may solve that problem.

Sixth, we can use special test vehicles that cannot be damaged on special test routes that cannot be damaged. Or at least limit the damage to both. That can be done making the test vehicles lightweight with failsafe features, and by making obstacles look to radar and other sensors like solid objects when they are really not—a sort of Potemkin village.

How do You Make a Standard Driver Interface?

DETAILED EXAMPLES

Here we provide examples of making a car and driver two "black box" abstractions loosely coupled through an interface. An interface is a connection across which energy, matter and/or information flow. An interface like this will usually have three parts: data, power, and a physical connection.

The left side of FIG. 2 shows an integrated, tightly coupled CAR and DRIVER in the same black box. This is the prior art.

The right side of FIG. 2 shows a modular, loosely coupled CAR and DRIVER in separate black boxes, joined by an INTERFACE. The examples of our invention look more like this.

These separate black boxes for CAR and DRIVER show abstractions that allow details to be hidden, with an INTERFACE loosely coupling the two. Of course the two black boxes each need to perform their function, and that function needs to be well defined. But how they perform the function is not defined. The implementation is hidden.

For the CAR, these things are hidden: Is it an electric car? Gasoline car? Two-wheel drive? Four-wheel drive?

For the DRIVER, these things are hidden: Is the driver a human? A computer? A combination of human and computer? Is the driver in the CAR or driving it remotely?

The INTERFACE between the CAR and DRIVER loosely couples the two together, providing just enough of a connection for each of them to perform its function well. The data provided across the INTERFACE needs to be sparse, but not too sparse, and adequate, but not copious. The better the balance struck between too little and too much, the better the INTERFACE works.

Human drivers are (obviously) not integrated into the car, and almost all cars have a standard driver interface worldwide. A driver can get out and walk away at any time. Another driver can take his or her place and quickly drive away.

By contrast, today's computer drivers are integrated, or built into the car, and all carmakers have a different driver interface. Replacing the computer driver with one of a completely different design would be like replacing the car's engine. It can be done, but it is not meant to be done.

With a plug-compatible interface, computer drivers are almost as loosely coupled and un-integrated as human drivers. That makes computer drivers almost as easy to replace as human drivers.

Here we will provide three detailed examples of how our invention works in: (1) a car with only a human driver, (2) a car with a human driver but some level of autonomy, and (3) a car with only a computer driver.

The design of an interface has a lot to say about how much it helps. "Information hiding" describes how computer program interfaces enable modular programming by hiding the details of how the modules work. Users of modules need not understand the complexities inside the modules—they are "black boxes". Computer program interfaces are an important part of software architecture, as they are key to organizing any complex piece of software.

Indeed, as noted in the discussion above, the computer industry has a long history of using interfaces between software modules (called "application program interfaces" or "APIs"). An interface between a car and driver looks a lot like those application program interfaces, so we draw on that history.

Application program interfaces are different from user interfaces, like the graphical user interface ("GUI") in the Windows operating system. A car/driver interface, like an application program interface, is between two machines, not between a human and a machine. With a car/driver interface, even if a human is driving the car the human needs to use a machine (like a steering wheel and a pedals connected to a microprocessor) as a user interface to create the commands sent across the interface.

Computer scientists have developed some helpful principles to use to make good application program interfaces that work well over the long term. Making good interfaces of any kind can be difficult to do, and those principles may help those who want to implement our car/driver interface.

Rather than describe those principles in detail, we will emphasize just one point. It is tempting to think that an interface should be as full-featured and complete as possible. But the reverse is usually true. An interface needs to be as simple as possible (but no simpler). That is, it should have what is needed but no more.

By limiting the interface to its bare essentials, the benefits of having an interface can often be obtained without locking those who design to the interface into the same technology in the future as they have now. The balance can be hard to find—just how simple is too simple? For that reason, although we have disclosed quite simple interfaces as examples here, experience may tell us that we need to bulk up our interfaces a bit.

In each of the examples the interfaces can be private, partner or public. These terms are largely self-explanatory, but are defined in our glossary above. While private and partner interfaces have some of the benefits of an interface outlined above, a public interface has all of them.

But public interfaces also have some drawbacks to the developer of the interface. Competitors have a better chance to compete when an interface is public. And public interfaces are much harder to change than private or partner interfaces. They must be fairly stable to have much value, and that makes it hard for them to evolve as technology evolves.

Implementation of the three types of interface is easy. Simply put, the specifications of a private interface are kept confidential within a company. The specifications of a partner interface are disclosed only to partners under a confidentiality agreement. The specifications of a public interface are published.

Example 1: Human Driver

In this example, we have a human driver using a steering wheel for turning, paddles for braking and acceleration, and buttons for other functions. When the human driver uses these controls they generate signals that are converted by software we call a driver control unit (Driver.txt in our computer code listing) into commands.

These commands are sent across an interface where they are converted by software we call a car operating system (Car.txt in our computer code listing) into control signals that are sent to the various car resources (motors, brakes, lights) that do what the driver wants done.

The physical connection is an Anderson connector power plug and socket. Power provided by the CAR side of the interface is direct current at 12 Volts and up to 20 Amps.

The data connection is serial communication through a wireless or wired network virtual socket. The data format for commands is given in FIGS. 9A and 9B. In this example, the data commands are for core and other driving-related resources (defined below). None are given for comfort resources (also defined below), which we leave to a separate interface not specified here but which is in principle the same.

Core Resources: the traction motors, steering gear and brakes that change the direction and speed of the car.

Other Driving-Related Resources: things like headlights, signal lights and windshield wipers that are related to driving but do not actually change the direction or speed of the car.

Comfort Resources: things like entertainment, communication, heating and cooling, seat and mirror adjustments, and navigation devices that are not directly related to moving the car.

In this example, driver commands go from DRIVER side to CAR side of the interface, but there are also status and other communications that go back from CAR side to DRIVER side.

On the DRIVER side of the interface, a human driver will need to decide when to change the direction or speed of the car, or to take some other action. Once that decision is made, a human driver will need to give these commands somehow, like using the traditional interface of steering wheel and accelerator and brake pedals or using an untraditional interface like the ill-fated steering joystick used in the Saab Prometheus prototype car in the early 1990s.

The wheel and pedals will need to be hooked up to, or include, a microprocessor running a program that will convert the analog inputs from the wheel and pedals into the commands to be sent across the interface. In this example, we have included a program called Driver.txt that can run on a Windows laptop that has plugged into one of its USB porta a SteelSeries Steering Wheel.

This example uses a steering wheel/paddles combination used on computers with driving simulation programs. But many other things can be used to get driving commands from a human driver. The standard steering wheel and accelerator and brake pedals can be used, with their output being converted into driving commands rather than analog signals. As technology evolves, many other driver control units become possible.

On the CAR side of the interface, the car will need to implement the commands received from the DRIVER side of the interface by changing those commands into control signals sent to the particular resources available on the car. In this example, we have included a program called Car.txt that can run on a Raspberry Pi that has hooked into its USB ports a Wi-Fi dongle and USB cables running to two Arduino Unos.

On the CAR side of the interface, you can perform a right or left turn by steering the front wheels, steering the back wheels, torque vectoring, wheel by wheel braking, a combination of these things, or something else. You can do braking by friction brakes, engine braking, regenerative braking, a combination of these things, or something else.

In this example, the program called Car.txt keeps track of all the car resources that are available and creates the proper signals to send to those resources to implement the driver's commands. How the Car.txt program—a car operating system—works is described in detail in "Car Operating System", patent application Ser. No. 15/049,004.

Example 1A: Human Driver (Different Commands)

In this example, a different data connection is made, and the command set is made much simpler. A USB male and female connector and an Anderson connector power plug and socket are the physical connections. The serial communication speed is 115,200 baud.

The bare minimum for a human to drive a car is that the human give the car a direction and a speed. To do that, we have reduced the command set in FIG. 10 to the bare minimum. We have made the commands as short as possible since at 115,200 baud the speed is limited to a maximum of about 1,000 characters a second.

Commands
Speed up
Slow down
Turn right
Turn left
Forward or reverse
Parking brake on or off
Right turn signal on or off
Left turn signal on or off
Horn on or off On the CAR side of the interface the car will need to figure out what resources (like motors, steering, or brakes) will be needed to carry out the driver's commands in the real world. Some sort of closed loop system using feedback will probably work best. The program CAR.txt could be modified to conform to this interface.

Example 2: Human Driver with Some Automation

In this example, we use the same power and data interfaces as in Example 1:

The physical connection is an Anderson connector power plug and socket. Power provided by the CAR side of the interface is direct current at 12 Volts and up to 40 Amps.

The data connection is serial communication through a wireless or wired network virtual socket. The data format for commands is given in FIG. 10.

In this example, however, the commands that come from the DRIVER side of the interface are generated by a computer driver using self-driving technology. Self-driving technology typically produces the same kind of steering, throttle and brake commands as a human driver. But this can differ depending on what type of self-driving technology is offered.

In this example, the human driver uses a steering wheel like the one described in Example 1 to control the car, but those control signals are used by software on the DRIVER side of the interface. The software compares the human driver control signals to those generated by the self-driving technology and decides which ones to process into commands to send over the interface. This is shown in part (b) of FIG. 6, and can be done by those skilled in the art.

Alternatively, there can be two separate DRIVER sides of the interface, both connecting to the CAR side of the interface. The two separate streams of commands can then be reconciled on the CAR side of the interface to send the needed control signals to the resources available on the car. This is shown in part (a) of FIG. 6, and can be done by those skilled in the art.

When a computer driver enters the picture, the simpler example in Example 1 needs to become a little more complicated. The commands and data can be different—more abstract—since machines need not have the same interface as humans. It may be best to move to a more sparse command set than in Example 1, perhaps something like Example 1A, or even a simple vector showing direction and speed as in FIG. 7.

The DRIVER side of the interface may also need to send warnings and the like to communicate between the self-driving technology and the human driver or other occupants of the car. That may include as well as things like sending a warning to prepare for a collision that the computer driver senses is imminent, so that the CAR side of the interface can do belt tensioning. Of course that kind of warning could be generated on the CAR side of the interface as well.

The sensors that the computer driver needs also need to be provided for. There can be a lot of sensors. For example, in October 2016 Tesla Motors announced an upgrade of its Autopilot self-driving technology. All new cars were being built with eight cameras that provide 360-degree visibility at up to 820 feet of distance. Tesla cars previously had just one forward-looking camera, as well as a forward radar and 12 long-range ultrasonic sensors positioned to see 16 feet around the car in every direction.

The new Tesla cars still come with just one radar sensor, but have enhanced processing to provide additional data about the car's surroundings. The radar can see through heavy rain, fog, dust, and even a car in front of it, according to Tesla. Tesla also said it updated the car's 12 ultrasonic sensors to improve the distance at which they can detect hard and soft objects from the previous 16 feet.

Those sensors can be considered part of the DRIVER side of the interface or the CAR side. If the sensors are considered part of the DRIVER side of the interface, then the CAR side of the interface will need to provide places to mount the sensors and to run wires from the sensors to the computers that run the self-driving technology. If the sensors are considered part of the CAR side of the interface, then there will need to be another interface between the sensors and the DRIVER side of the interface to get the signals from those sensors.

On the DRIVER side of the interface, the computer driver does not need to specify whether the speeding up or slowing down is done for adaptive cruise control, automated emergency braking, parallel parking assistance, or something else. The driver does not need to specify whether the turning right or left is for lane-keeping assistance, parallel parking assistance, or something else.

When a human and computer driver together drive the car, they will need to work closely together. As noted above, that cooperation can be done on the CAR side of the interface or the DRIVER side. The interface implementation may change depending on the choice made, but the concept of an interface will not change.

Care will need to be taken. It is easy for the human and computer drivers to work at cross purposes instead of collaboratively. The irony is that the more we automate, the more skilled and practiced the human drivers have to be.

Why is that? Because driving is a very tricky activity. When we first learn to drive, driving seems overwhelmingly complex. But after a few months of driving, most activity becomes "automated," done subconsciously without thought or mental effort. Soon most drivers become comfortable enough to drive at high speeds down crowded highways while talking, eating, daydreaming, or even worse.

At that point, driving is easy. Except when it isn't, and that is when accidents occur. For any individual driver, the chance of an accident is low. For a nation, the number of accidents, injuries, and deaths is astoundingly high. Self-driving technology can help The danger lies when a computer driver takes over some of the driving tasks. If drivers daydream and do other tasks while driving now, imagine when the car has taken over much of the driving. When a computer driver can take over driving for minutes or even hours, no driver is going to be paying much attention. If there is a problem the computer driver cannot handle, the human driver is unlikely to be ready to take over.

Moreover, when human drivers do little driving, their skills will atrophy. Although the law says that a human driver must take over when the computer driver fails, in reality they will be unable to. They will be out of the loop.

Having computer drivers will reduce accidents and injuries. But when an accident does occur, it will probably be a big one.

Solving the problem will take a lot of experience, a lot of research, and a lot of thought. And, unfortunately, a lot of death and disaster. The horse is a good metaphor for how a partially autonomous car would work. Like a horse which can be loosely guided when conditions are simple, a computer driver can easily take over mundane tasks. When the human driver needs to, however, he or she can tightly guide the horse. A good horse and rider make a great combination.

Or perhaps we can take it even further. That is, let the human driver give high level guidance about where to go, how fast to go, and where to turn. But let the computer driver do the precise driving—sending control commands about how much and when to steer, brake, and accelerate. That way, until the computer driver can do everything, the human driver is always in the loop, always doing the high-level control.

Eventually computer drivers may be good enough to take over completely, as in Example 3. But the path toward full self-driving must go through the dangerous stage of collaborative human/computer driving. Having an interface between CAR and DRIVER will help lessen the danger and speed up progress in self-driving technology.

The main issue now is with partially autonomous cars, which present a very difficult issue since we need both human and computer drivers in every car. The point is that these issues have nothing to do with any particular car, but with all cars. It does not matter whether the car is gasoline or electric, or made by GM or Toyota. These issues can be handled for every type of car.

Interactions between a driver and a car can become very complex as more functions are offered. The chance of conflict between the driver (particularly computer driver) and the car increase. Having an interface can reduce complexity.

There will be many things to keep in mind as possibilities to handle through the interface specifications. But this can be done as the technology develops. For example, early on it will be important to think about how to handle lane-keeping, braking to avoid something in front, and other things that are already implemented by the car. They need not be done on the DRIVER side of the interface, and conflicts should probably be avoided.

There are many different possibilities where humans and computers work together to drive the car. The Society of Automotive Engineers has a scale of 0 (human only) to 5 (computer only), with levels 1 to 4 increasing in the responsibility given to the computer driver. The interface handles all levels from 0 to 5, and there are different ways to configure the situation. In levels 1 to 4, for example, the human could be on either side of the interface.

Alerts to the human driver can also be part of the interface, as well as control of other car accessories like lights and windshield wipers. As self-driving technology evolves, thought will need to be given on how to handle the increasing amount of options displayed to the driver using the dashboard, heads-up displays with augmented reality features, a central monitor or new curved displays, among others. Deciding what, when, where and how information is given to the driver or passengers is important. The interface can adapt to handle it all.

On the CAR side of the interface, cars will have various devices to implement the commands coming from the DRIVER side of the interface. These will include, of course, devices that change car dynamics, like traction motors, brakes and steering. But they might also include communication and other devices that communicate with the outside world of a car. These may be indicators, like turn signals or caution lights. Or communication devices to send data to the cloud or from the car to infrastructure (V2X). Or assistance devices like belt tensioners or windshield wipers. All can be added, if desired, to the interface.

Example 3: Computer Driver

This example is of full automation where no human is involved in driving the car. Of course a human will usually need to give the computer driver directions on where to go, but a computer will be driving the car and controlling its speed and direction from moment to moment.

Surprisingly, the interface in the case of only a computer driver is the easiest to deal with. In this example, the interface is the same as in Example 1A above. The CAR side of the interface need not know that the DRIVER side is a computer rather than a human. That changes nothing as far as the CAR side of the interface is concerned.

The self-driving technology will need to conform its output to command specification for the DRIVER side of the interface. It will then need to send those commands to the CAR side of the interface. The physical USB and Anderson connectors will also need to be provided by the self-driving technology provider as part of its system.

DRAWINGS

FIG. 1 shows an example (humorous) of how both sides of an interface have to fit together just right to work.

FIG. 2 compares an interface between car and driver with the prior art.

FIG. 6 shows two ways—(a) and (b)—to combine human and computer drivers.

FIGS. 9A and 9B show one example of a data interface between the car and driver (for Examples 1 and 2).

FIG. 10 shows a second example of the data interface between the car and driver (for Examples 1A and 3).

Figure 1:
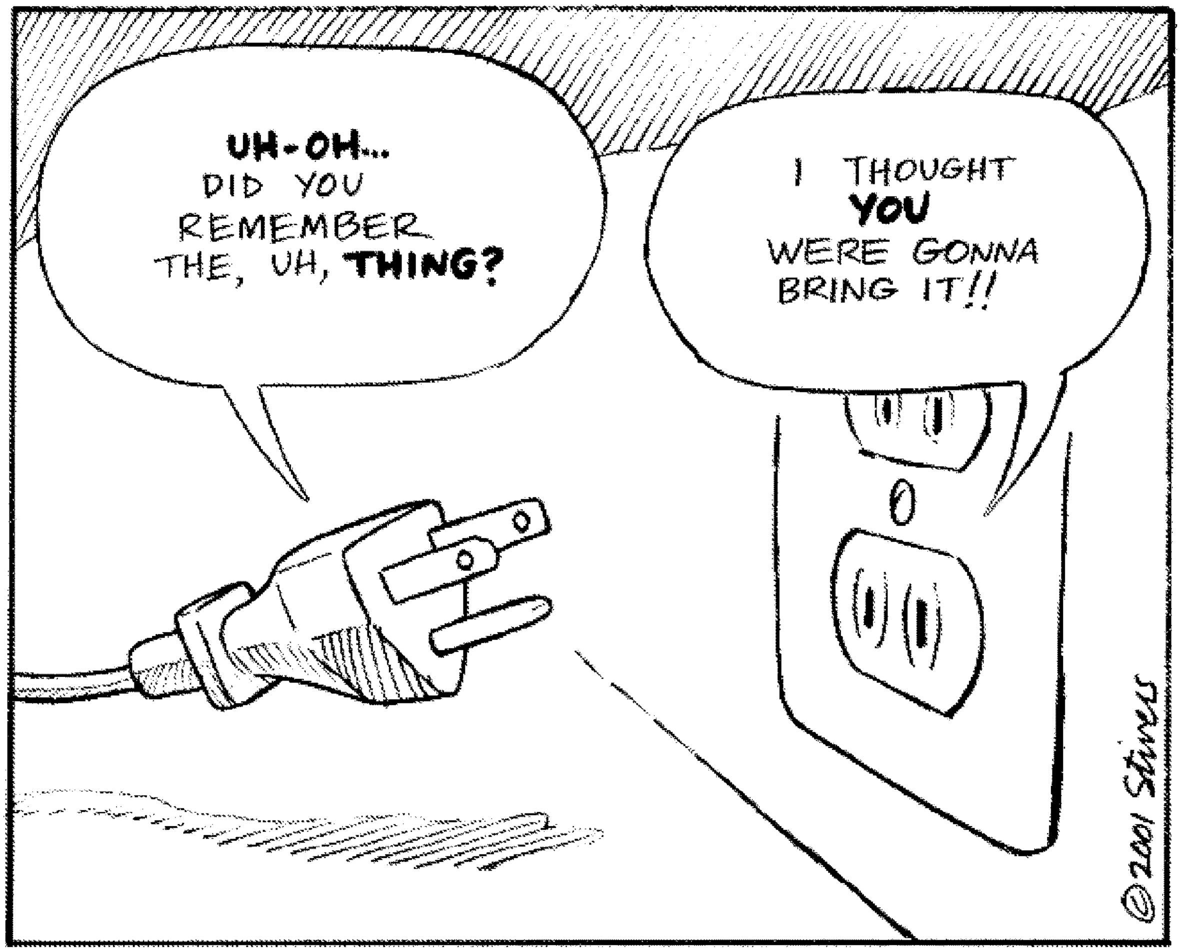
Figure 2:
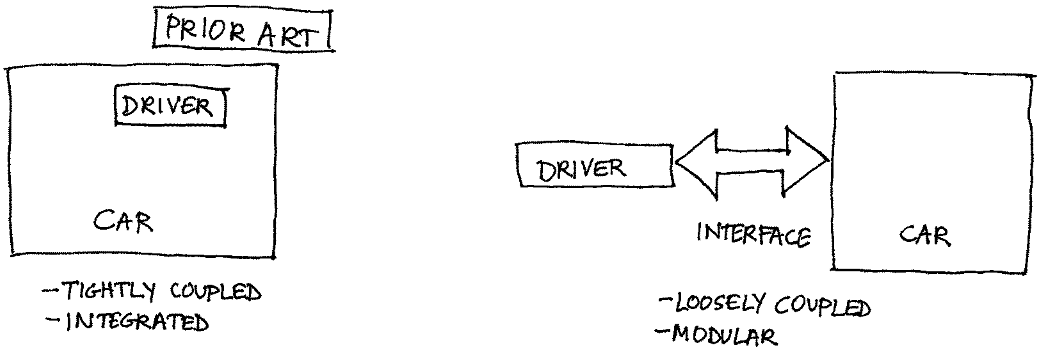
Figure 3:
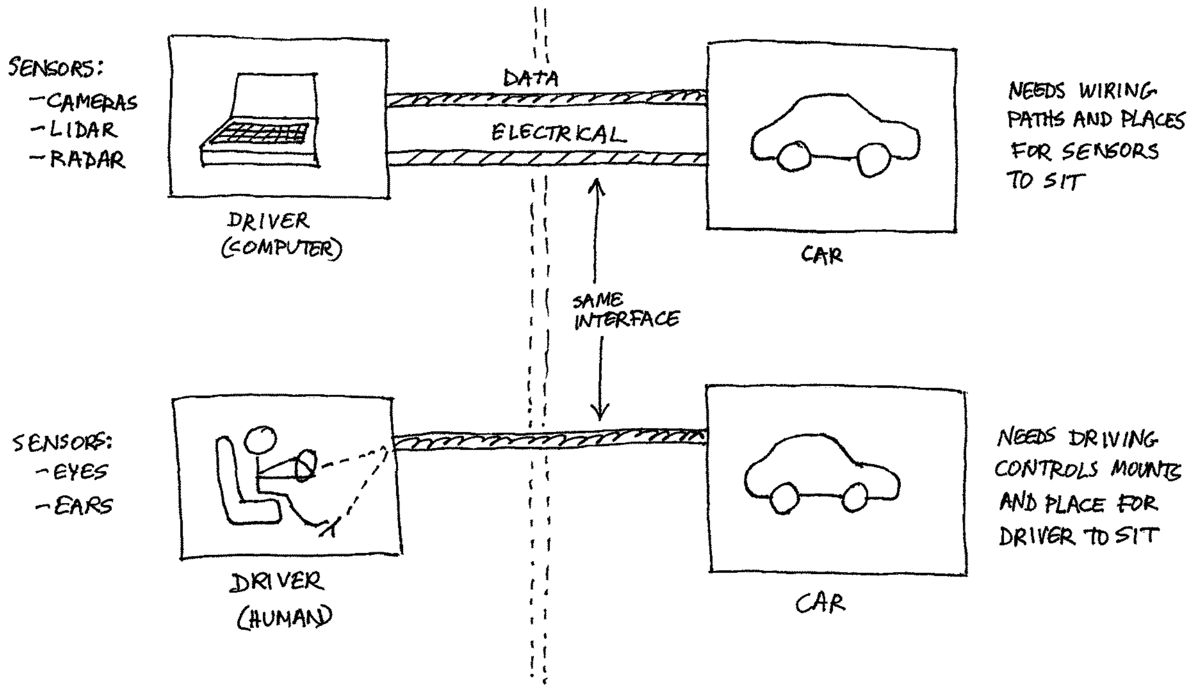
FIG. 3 shows that a human driver and a computer driver can use the same plug-compatible interface.
Figure 4:
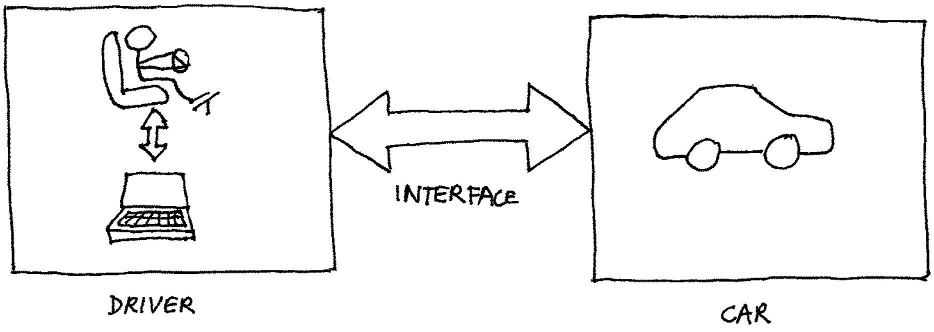
FIG. 4 shows a car and driver as "black boxes" loosely coupled together through an interface, where the driver can be a human, or computer, or both.
Figure 5:
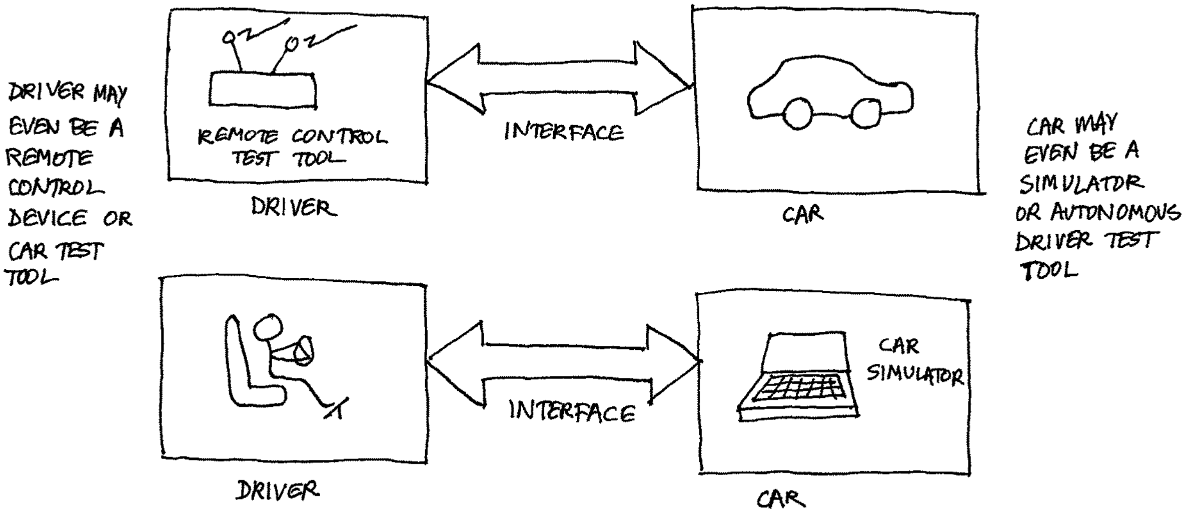
FIG. 5 shows how a plug-compatible interface lets any driver be coupled with any car.
Figure 7:
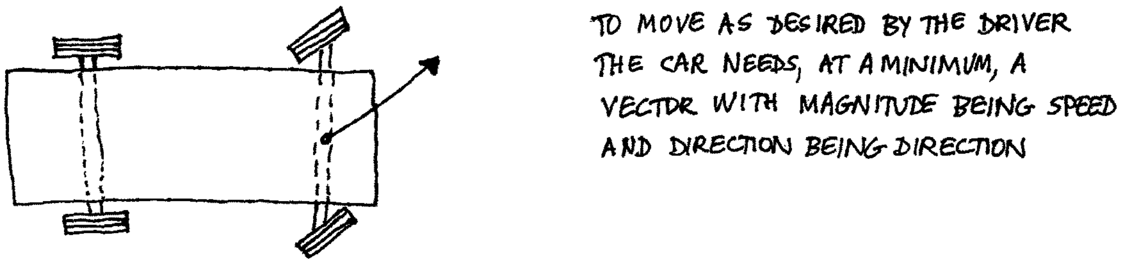
FIG. 7 shows that a vector—with car speed being the vector's magnitude and car direction being the vector's direction—gives the minimum information needed to control a car.
Figure 8:
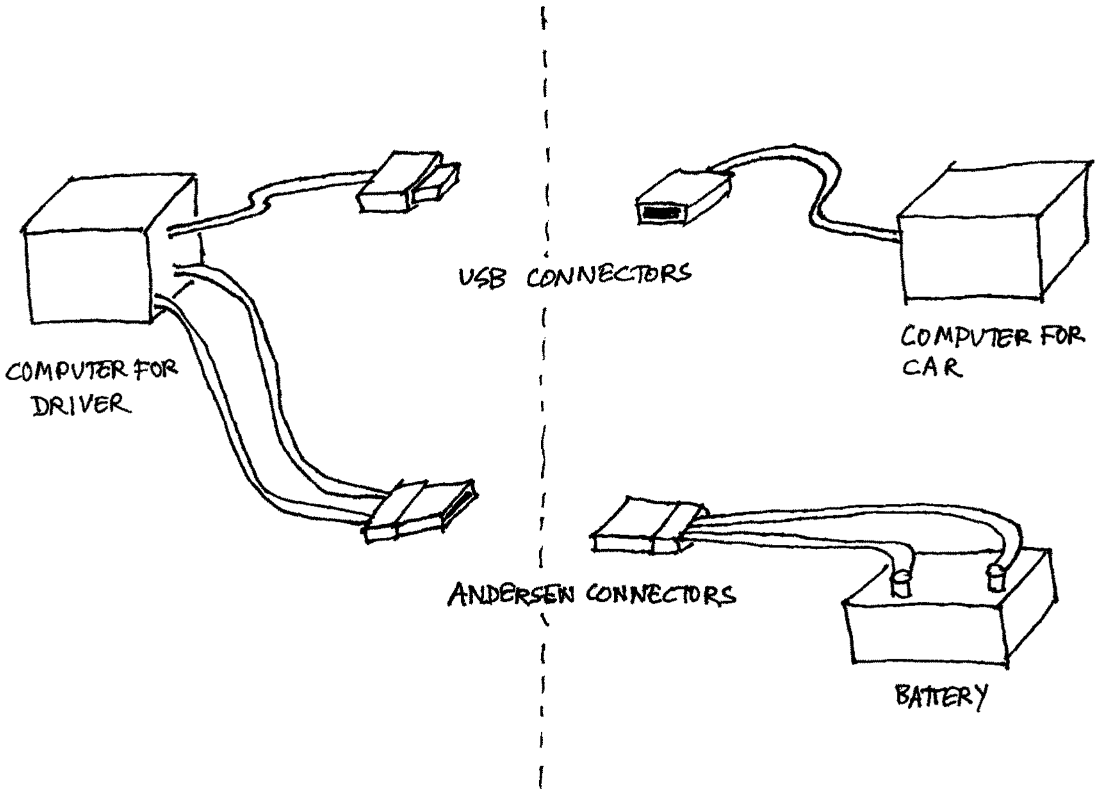
FIG. 8 shows an example of a physical interface between the car and driver.
Figure 11:
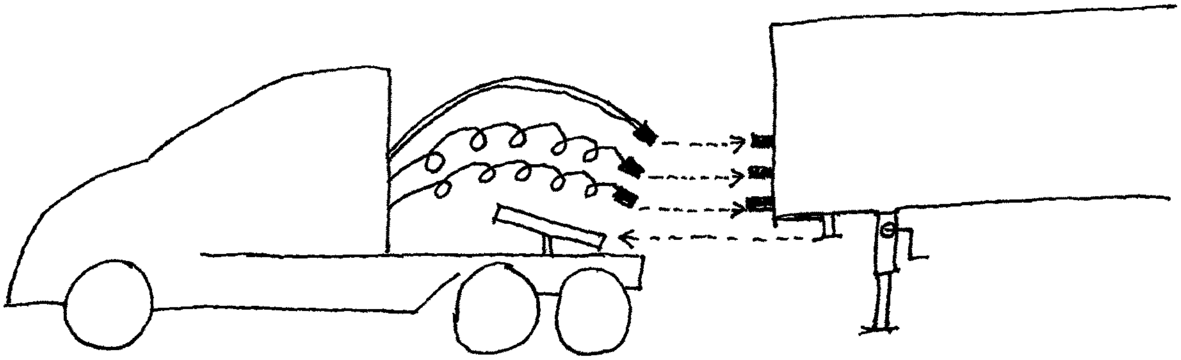
FIG. 11 shows an example of a plug-compatible interface between a semi-trailer and tractor that consists of two air hoses, an electrical cable, and a fifth-wheel/kingpin combination. The industry-standard interface lets any tractor in North America couple with any semi-trailer, taking just minutes to hook up and drive away.

We claim:

1. A method of making a standard, physical plug-compatible interface between a car and a driver of the car, able to connect wired or wirelessly, to allow the driver to control the car by issuing electronic driving commands that include at least speed and direction commands, where the method includes at least the steps of:

defining interface specifications of the wired or wireless physical connection between an electronic communication device of the car and an electronic communication device of the driver over which the driving commands can be sent, defining interface specifications of the format and content of the driving commands, hiding, other than the interface specifications, the implementation details of how functions are carried out within the car and the driver so the car and the driver can be loosely coupled, and making the interface specifications public.

2. The method of claim 1 where the driver of the car is a computer running a self-driving program.

* * * * *